US012173538B2

(12) United States Patent
Zhang

(10) Patent No.: US 12,173,538 B2
(45) Date of Patent: Dec. 24, 2024

(54) TRANSMISSION SYSTEM ALLOWING WINDOW TO BE OPENED IN THREE DIRECTIONS

(71) Applicant: Qiang Zhang, Tianjin (CN)

(72) Inventor: Qiang Zhang, Tianjin (CN)

( * ) Notice: Subject to any disclaimer, the term of this patent is extended or adjusted under 35 U.S.C. 154(b) by 0 days.

(21) Appl. No.: 18/275,423

(22) PCT Filed: Mar. 2, 2021

(86) PCT No.: PCT/CN2021/078676
§ 371 (c)(1),
(2) Date: Aug. 2, 2023

(87) PCT Pub. No.: WO2022/165890
PCT Pub. Date: Aug. 11, 2022

(65) Prior Publication Data

US 2024/0117662 A1 Apr. 11, 2024

(30) Foreign Application Priority Data

Feb. 3, 2021 (CN) ........................ 202110149200.3

(51) Int. Cl.
*E05D 15/48* (2006.01)
*E05C 9/06* (2006.01)

(52) U.S. Cl.
CPC ................ *E05D 15/48* (2013.01); *E05C 9/06* (2013.01); *E05D 2015/485* (2013.01);
(Continued)

(58) Field of Classification Search
CPC ... E05D 15/48; E05D 15/58; E05D 2015/485; E05C 9/06; E05C 9/1808; E05C 9/1858;
(Continued)

(56) References Cited

U.S. PATENT DOCUMENTS 5,682,710 A 11/1997 Davies et al.
5,881,498 A * 3/1999 Goggin ................ E05D 15/526 49/192

(Continued)

FOREIGN PATENT DOCUMENTS

CN 104196380 A 12/2014
CN 106460431 A * 2/2017 .............. E05C 9/14

(Continued)

*Primary Examiner* — Jerry E Redman
(74) *Attorney, Agent, or Firm* — Bayramoglu Law Offices LLC

(57) ABSTRACT

A transmission system allowing a window to be opened in three directions includes a door hinge assembly, a guide wheel assembly, a lock assembly, a handle, a first transmission lever, a second transmission lever, an angle converter, a first gear tooth combination, a second gear tooth combination and a third gear tooth combination. The angle converter is connected at a position of the first transmission lever and a position of the second transmission lever located at corners of a window sash. The first gear tooth combination is arranged in the handle. The second gear tooth combination and the third gear tooth combination are connected to the top and the bottom of the window sash respectively. The lock assemblies are symmetrically provided at two sides of the second gear tooth combination and the third gear tooth combination.

6 Claims, 18 Drawing Sheets

(52) U.S. Cl.
CPC ... *E05Y 2201/626* (2013.01); *E05Y 2201/688* (2013.01); *E05Y 2201/716* (2013.01); *E05Y 2201/722* (2013.01); *E05Y 2900/148* (2013.01)

(58) Field of Classification Search
CPC ... E05C 9/22; E05C 9/12; E05C 17/32; E05Y 2201/626; E05Y 2201/716; E05Y 2201/722; E05Y 2900/148; E06B 3/50; E06B 3/5054
USPC ......... 49/176, 177, 178, 180, 187, 188, 189, 49/192
See application file for complete search history.

(56) References Cited

U.S. PATENT DOCUMENTS

| | | | | |
|---|---|---|---|---|
| 6,701,669 | B1 * | 3/2004 | Yorgason | E06B 7/096 49/82.1 |
| 2023/0250685 | A1 * | 8/2023 | Curtis | E05F 15/611 49/324 |
| 2023/0340824 | A1 * | 10/2023 | Bernhagen | E05F 11/16 |
| 2024/0117662 | A1 * | 4/2024 | Zhang | E05C 9/06 |

FOREIGN PATENT DOCUMENTS

| | | | | | |
|---|---|---|---|---|---|
| CN | 107762262 | A | | 3/2018 | |
| CN | 108331496 | A | | 7/2018 | |
| CN | 110005311 | A | | 7/2019 | |
| CN | 110080656 | A | | 8/2019 | |
| CN | 210105631 | U | | 2/2020 | |
| CN | 112796595 | A | * | 5/2021 | E05C 17/32 |
| CN | 115341817 | A | * | 11/2022 | |
| DE | 19602025 | A1 | * | 7/1997 | E05C 9/066 |
| DE | 202021102238 | U1 | * | 9/2022 | E05D 15/5202 |
| EP | 0379866 | A1 | * | 8/1990 | |
| FR | 3053070 | A1 | * | 12/2017 | E05F 15/627 |
| FR | 3059698 | A1 | * | 6/2018 | E05D 15/524 |
| GB | 2067638 | A | * | 7/1981 | E05D 15/52 |
| WO | WO-2004063507 | A1 | * | 7/2004 | E05D 15/30 |

* cited by examiner

TRANSMISSION SYSTEM ALLOWING WINDOW TO BE OPENED IN THREE DIRECTIONS

CROSS REFERENCE TO THE RELATED APPLICATIONS

This application is the national phase entry of International Application No. PCT/CN2021/078676, filed on Mar. 2, 2021, which is based upon and claims priority to Chinese Patent Application No. 202110149200.3, filed on Feb. 3, 2021, the entire contents of which are incorporated herein by reference.

TECHNICAL FIELD

The present invention pertains to the technical field of door and window hardware, and particularly relates to a transmission system allowing a window to be opened in three directions.

BACKGROUND

At present, windows generally used in domestic buildings are basically casement windows, sliding windows (i.e., translating windows) and various hopper windows, as well as drifting windows and inward tilt-turn windows emerged in the later period. The so-called drifting window is a sliding window added with an inward tilting function. The so-called inward tilt-turn window is a casement window added with an inward tilting function.

The sliding window has been basically eliminated due to its poor air tightness and water tightness, and a failure of completely scrubbing its fixed glass outdoor side. The casement window (the casement window herein refers to an in-swinging casement window) has been criticized for occupying an indoor usable area and being prone to colliding with people. The drifting window still fails to solve the problem of glass scrubbing. The inward tilt-turn window also fails to solve its inherent problems caused during huge ventilation.

There is also a problem of inward tilt opening. Firstly, the opening degree is too small and the ventilation is insufficient; secondly, the opening degree is non-adjustable and cannot be chosen; and thirdly, an upper edge of a window sash lacks fixing points, causing potential safety concerns.

Therefore, there is a need for a window allowing to be opened in three directions, and this window is convenient to open, can be opened at a large angle in case of inward tilting, and can be inwardly opened, inwardly tilted, and pushed and pulled. The core of opening and closing the window allowing to be opened in three directions lies in its equipped hardware and mutual cooperation between the hardware. Therefore, a transmission system allowing a window to be opened in three directions is proposed.

SUMMARY

An objective of the present invention is to provide a transmission system allowing a window to be opened in three directions, which can realize opening and closing of a window sash in three directions, i.e., inward tilting, inward translating and push-pull. The opening degree of the window sash can be adjusted in a state of inward tilt opening, and the problem of metal fatigue of hardware and the problem of disengagement of the window sash are effectively solved.

The present invention provides the following technical solution: a transmission system allowing a window to be opened in three directions includes a door hinge assembly, a guide wheel assembly, a lock assembly, a wind brace, a handle, a first transmission lever, a second transmission lever, an angle converter, a first gear tooth combination, a second gear tooth combination and a third gear tooth combination, wherein the angle converter is connected at a position of the first transmission lever and a position of the second transmission lever located at corners of a window sash, and the first gear tooth combination is arranged in the handle for driving the first transmission lever and the second transmission lever to move synchronously and reversely;

the first transmission lever is connected to the second gear tooth combination at a position at the top of the window sash, the lock assemblies that are synchronous are symmetrically provided at two sides of the second gear tooth combination, and a first spring bolt driving block in the lock assembly is connected between the second gear tooth combination and the first transmission lever;

the second transmission lever is connected to the third gear tooth combination at a position at the bottom of the window sash, the lock assemblies that are synchronous are symmetrically provided at two sides of the third gear tooth combination, and a second spring bolt driving block in the lock assembly is connected between the third gear tooth combination and the second transmission lever;

the door hinge assemblies are symmetrically arranged at two ends of the side of the window sash that is away from the handle, the door hinge assemblies at the upper end and the lower end of the window sash are respectively connected to the first transmission lever and the second transmission lever that move synchronously, and a door hinge on the door hinge assembly is provided with a first movable joint for flexing;

the guide wheel assembly is arranged at each corner of the window sash, the guide wheel assembly located at the upper part of the window sash is connected to the first transmission lever, the guide wheel assembly located at the lower part of the window sash is connected to the second transmission lever, a second movable joint for flexing is arranged in the guide wheel assembly and located at the bottom of a cylindrical guide wheel, a crank lever is fixed to the bottom of the second movable joint in a rotating manner, and a rising side of the cylindrical guide wheel is provided with a stopper for obstructing the crank lever;

the wind brace is of a multi-section structure, one end of the wind brace is fixed to the top of a window frame, the other end of the wind brace is fixedly provided with a front upright, a wind brace sleeve that matches the front upright is provided at the top of the window sash, and the wind brace sleeve is arranged corresponding to the front upright; and the transmission system further includes a spring bolt catch, a door-hinge slot and a sliding rail, the spring bolt catch, the door-hinge slot and the sliding rail being respectively fixed to the window frame corresponding to the lock assembly, the door hinge assembly and the guide wheel assembly.

Further, scales of gear positions 0, 1, 2 and 3 are arranged on a shell piece of the handle in a circumferential direction of the handle, and the four gear positions correspond to three advancing strokes of the door hinge assembly, the guide wheel assembly and the lock assembly, namely a first stroke, a second stroke and a third stroke, the first stroke, the second stroke and the third stroke respectively corresponding to open states of the window sash, i.e., horizontal opening, inward translating opening and inward tilt opening.

Further, the first gear tooth combination includes a first rack, a second rack, a third rack, a fourth rack, a first gear and a second gear; the first gear is fixedly arranged on a rotating shaft of the handle; the first rack and the second rack are distributed at two sides of the first gear in parallel and engage the first gear; the third rack and the fourth rack are distributed at two sides of the second gear in parallel and engage the second gear; the third rack is vertically fixed to a lateral part of the second rack; the third rack and the fourth rack are capable of moving synchronously and reversely under the drive of the handle; the first transmission lever is fixed to the fourth rack; and the second transmission lever is fixed to the third rack.

Further, the second gear combination a and the second gear combination b each include a fifth rack, a sixth rack and a third gear; the fifth rack and the sixth rack are arranged at two sides of the third gear in parallel and engage the third gear; the first spring bolt driving block and the second spring bolt driving block in the lock assembly are connected to the corresponding fifth rack and sixth rack according to a synchronous and reverse moving relationship; and a slope on the first spring bolt driving block for driving a spring bolt to rise/fall is horizontally located one stroke faster than the second spring bolt driving block.

Further, the door-hinge slot includes a first door-hinge slot and a second door-hinge slot that are of blind hole structures; a chute is arranged between the first door-hinge slot and the second door-hinge slot; a notch is provided at a side of the second door-hinge slot facing toward the inside of the window frame; and the notch is used for shift-out of an end portion of the door hinge of the door hinge assembly.

Further, the first movable joint and the second movable joint are flexed to accumulate a stroke the same as one stroke for which the door hinge assembly and the guide wheel assembly advance.

Compared with the prior art, the present invention has the following beneficial effects and prominent progresses.

According to the present invention, the door and window opening transmission system is composed of door and window hardware. The system enables the related door hinge assembly, guide wheel assembly, lock assembly and other hardware to complete corresponding actions by the gear positions 0, 1, 2 and 3 scaled on the handle, so as to realize opening and closing of the window sash in three directions, i.e., inward tilting, inward translating and push-pull. Moreover, owing to the unique design of the wind brace, the opening degree of the window sash can be adjusted in a state of inward tilt opening, and the problem of metal fatigue of hardware and the problem of disengagement of the window sash are effectively solved.

BRIEF DESCRIPTION OF THE DRAWINGS

The accompanying drawings are provided for further understanding of the present invention, constitute a part of the description, and together with the embodiments of the present invention, serve to explain the present invention, but do not constitute limitations to the present invention. In the drawings.

Figure 1:
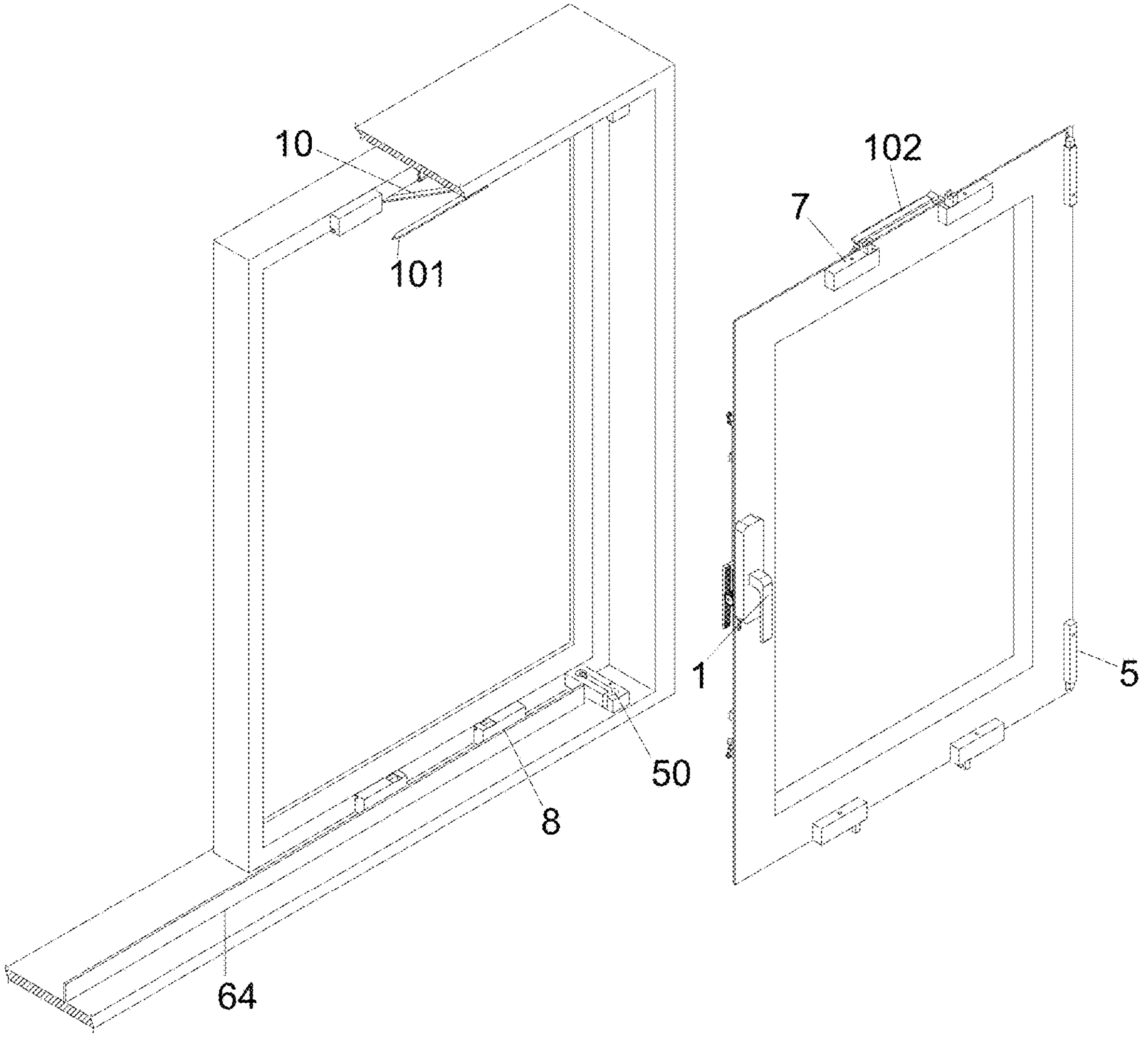
FIG. 1 is a schematic structural diagram of assembly between door and window hardware, a window frame and a window sash according to the present invention.

Reference signs in the figures: handle 1, first gear tooth combination 11, first gear 12, first rack 13, second rack 14, third rack 15, second gear 16, fourth rack 17, first transmission lever 21, second transmission lever 22, angle converter 3, second gear tooth combination 41, third gear tooth combination 42, fifth rack 401, third gear 402, sixth rack 403, door hinge assembly 5, door-hinge slot 50, first door-hinge slot 501, second door-hinge slot 502, door hinge 51, first movable joint 52, chute 53, notch 54, guide wheel assembly 6, cylindrical guide wheel 61, second movable joint 62, crank lever 63, sliding rail 64, stopper 65, lock assembly 7, first spring bolt driving block 71, second spring bolt driving block 72, spring bolt catch 8, wind brace 10, front upright 101, wind brace sleeve 102.

DETAILED DESCRIPTION OF THE EMBODIMENTS

The present invention will be further described below in combination with specific embodiments. These embodiments are only used to illustrate the present invention but not to limit the scope of the present invention. It should be noted that, in the descriptions of the present invention, the terms "mounted", "provided", and "connected" need to be broadly understood, unless otherwise definitely specified and limited. For example, connection may be fixed connection, or detachable connection or integrated connection, or may be mechanical connection or electrical connection, or may be direct connection, or indirect connection via an intermediate medium, or communication of inner parts of two elements. A person of ordinary skill in the art can understand the specific meanings of the above terms in the present invention in accordance with specific conditions.

The structural features of the present invention will now be described in detail with reference to the accompanying drawings of the description.

Figure 2:
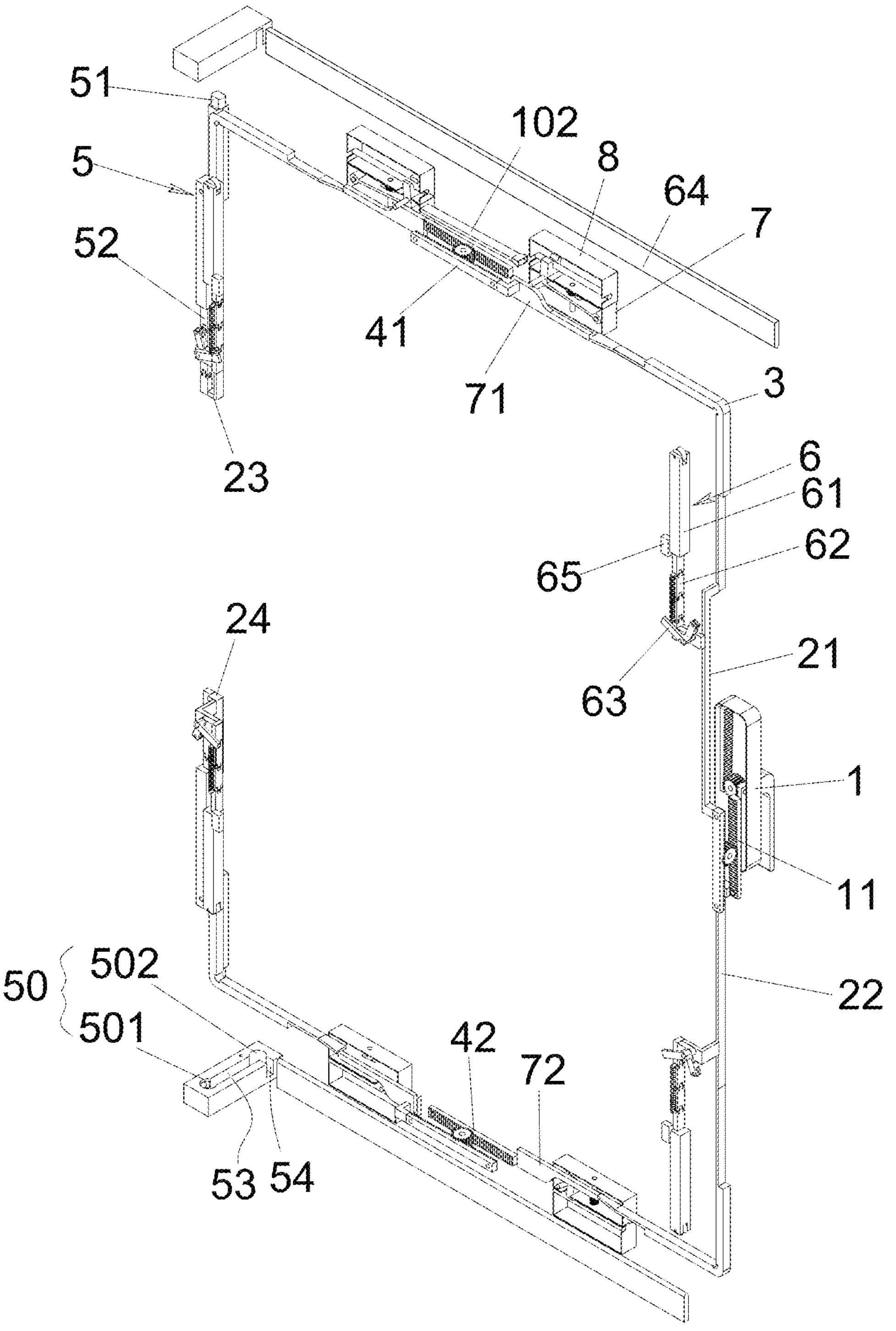
FIG. 2 is a schematic structural diagram of a door and window opening transmission system composed of hardware according to the present invention.
Figure 3:
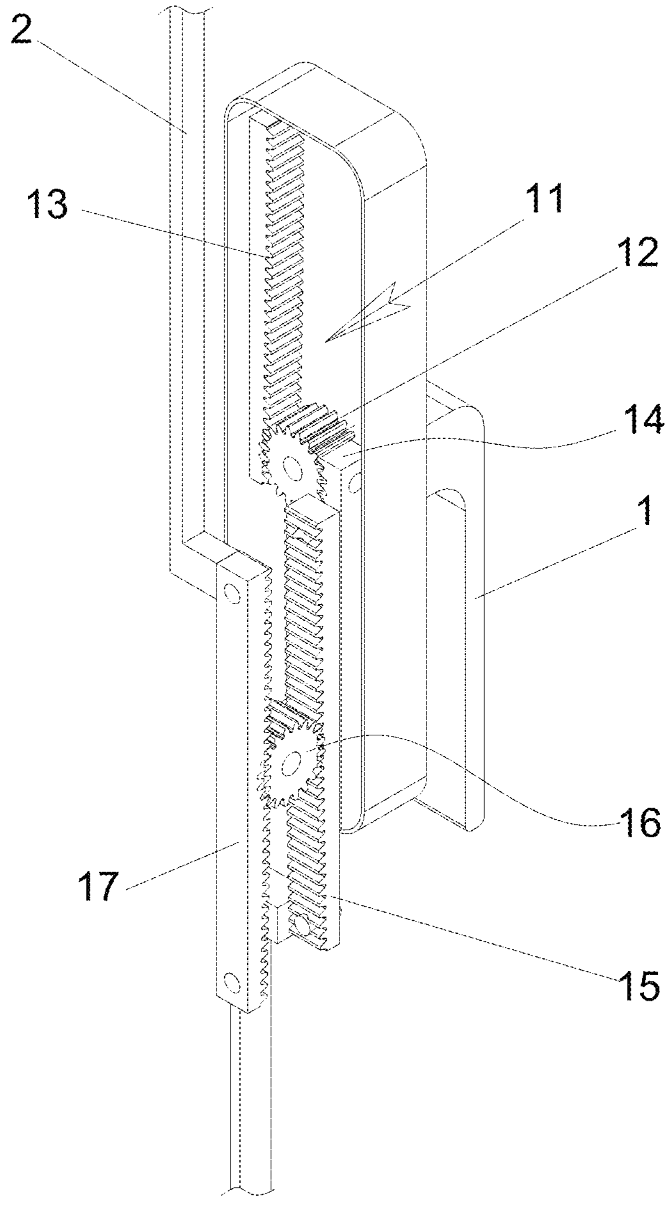
FIG. 3 is a schematic structural diagram of a first gear tooth combination according to the present invention.
Figure 4:
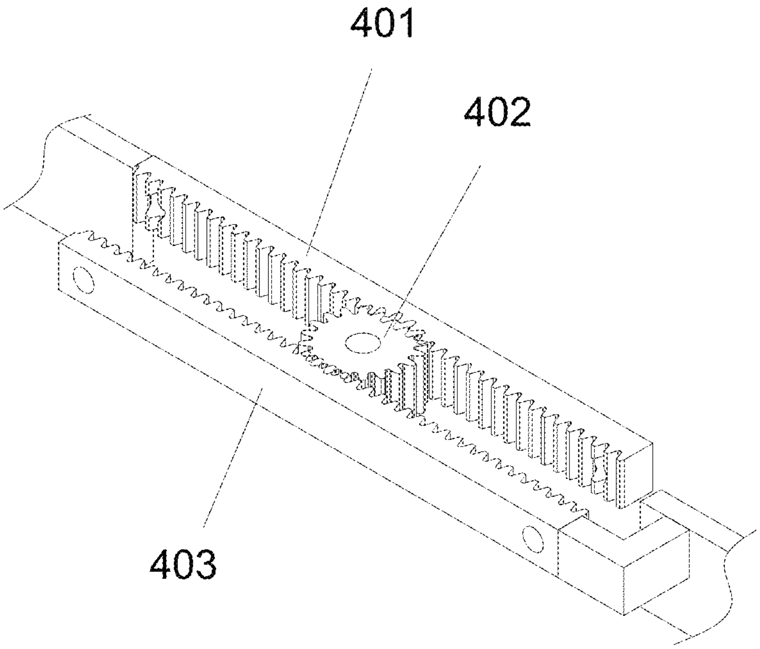
FIG. 4 is a schematic structural diagram of a second gear tooth combination or b according to the present invention.

Referring to FIGS. 1 to 3, the transmission system allowing a window to be opened in three directions includes a door hinge assembly 5, a guide wheel assembly 6, a lock assembly 7, a wind brace 10, a handle 1, a first transmission lever 21, a second transmission lever 22, an angle converter 3, a first gear tooth combination 11, a second gear tooth combination 41 and a third gear tooth combination 42. The angle converter 3 is connected at a position of the first transmission lever 21 and a position of the second transmission lever 22 located at corners of a window sash. The first gear tooth combination 11 is arranged in the handle 1 for driving the first transmission lever 21 and the second transmission lever 22 to move synchronously and reversely. The first gear tooth combination 11 includes a first rack 13, a second rack 14, a third rack 15, a fourth rack 17, a first gear 12 and a second gear 16. The first gear is fixedly arranged on a rotating shaft of the handle 1. The first rack 13 and the second rack 14 are distributed at two sides of the first gear 12 in parallel and engage the first gear 12. The third rack 15 and the fourth rack 17 are distributed at two sides of the second gear 16 in parallel and engage the second gear 16. The third rack 15 is vertically fixed to a lateral part of the second rack 14. The third rack 15 and the fourth rack 17 are capable of moving synchronously and reversely under the drive of the handle 1. The first transmission lever 21 is fixed to the fourth rack 17. The second transmission lever 22 is fixed to the third rack 15.

Referring to FIGS. 1, 2, 4 and 20, the first transmission lever 21 is connected to the second gear tooth combination 41 at a position at the top of the window sash; the lock assemblies 7 that are synchronous are symmetrically provided at two sides of the second gear tooth combination 41; a matched spring bolt catch 8 is fixedly arranged on the window frame corresponding to a lock body of the lock assembly 7; a first spring bolt driving block 71 in the lock assembly 7 is connected between the second gear tooth combination 41 and the first transmission lever 21; the second transmission lever 22 is connected to the third gear tooth combination 42 at a position at the bottom of the window sash; the lock assemblies 7 that are synchronous are symmetrically provided at two sides of the third gear tooth combination 42; and a second spring bolt driving block 72 in the lock assembly 7 is connected between the third gear tooth combination 42 and the second transmission lever 22. The second gear combination a41 and the second gear combination b42 each include a fifth rack 401, a sixth rack 403 and a third gear 402; the fifth rack 401 and the sixth rack 403 are arranged at two sides of the third gear 402 in parallel and engage the third gear 402; the first spring bolt driving block 71 and the second spring bolt driving block 72 in the lock assembly 7 are connected to the corresponding fifth rack 401 and sixth rack 403 according to a synchronous and reverse moving relationship; and a slope on the first spring bolt driving block 71 for driving a spring bolt to rise/fall is horizontally located one stroke faster than the second spring bolt driving block 72.

Figure 22:
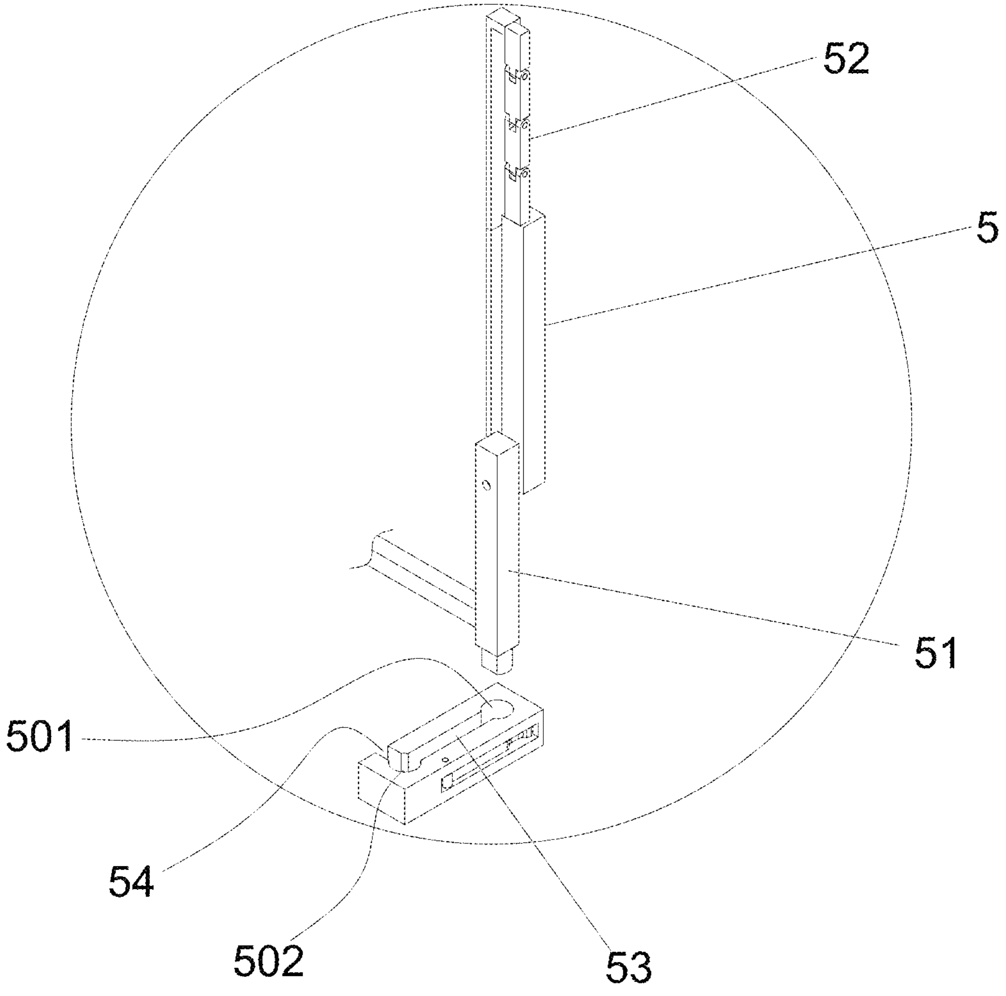
FIG. 22 is a schematic structural diagram of a door hinge assembly according to the present invention.

Referring to FIGS. 1, 2 and 22, the door hinge assemblies 5 are symmetrically arranged at two ends of the side of the window sash that is away from the handle 1; the door hinge assemblies 5 at the upper end and the lower end of the window sash are respectively connected to the first transmission lever 21 and the second transmission lever 22 that move synchronously; a door hinge 51 on the door hinge assembly 5 is provided with a first movable joint 52 for flexing; a door-hinge slot 50 is fixedly mounted on the window frame corresponding to the door hinge 51; the door-hinge slot 50 includes a first door-hinge slot 501 and a second door-hinge slot 502 that are of blind hole structures; a chute 53 is arranged between the first door-hinge slot 501 and the second door-hinge slot 502; a side of the second door-hinge slot 502 facing toward the inside of the window frame is provided with a notch 54; and the notch 54 is used for shift-out of an end portion of the door hinge of the door hinge assembly 5.

Figure 21:
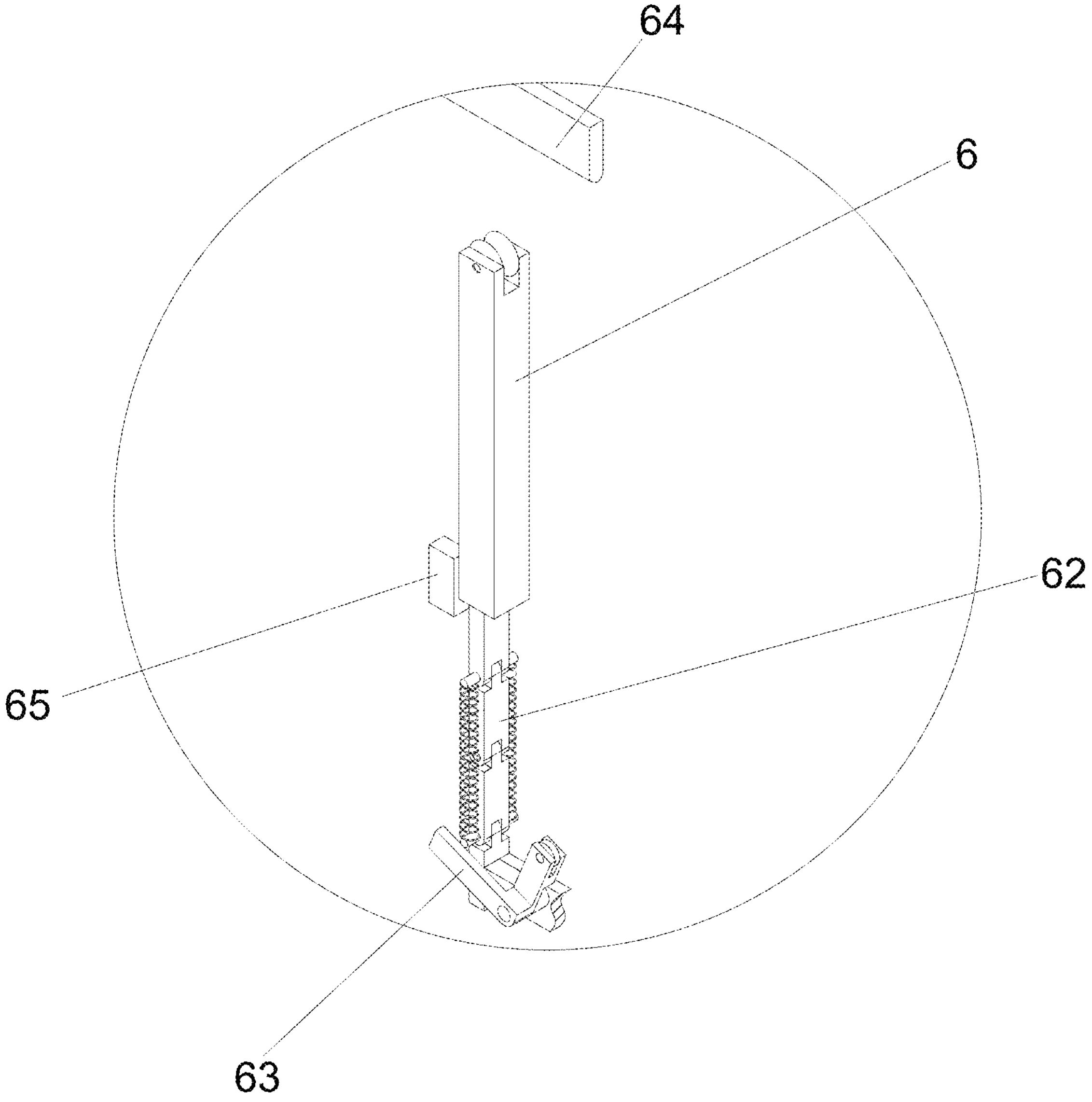
FIG. 21 is a schematic structural diagram of a guide wheel assembly according to the present invention.

Referring to FIGS. 1, 2 and 21, the guide wheel assembly 6 is arranged at each corner of the window sash; the guide wheel assembly 6 located at the upper part of the window sash is connected to the first transmission lever 21; the guide wheel assembly 6 located at the lower part of the window sash is connected to the second transmission lever 22; a second movable joint 62 for flexing is arranged in the guide wheel assembly 6 and located at the bottom of a cylindrical guide wheel 61; the first movable joint 52 and the second movable joint 62 are flexed to accumulate a stroke the same as one stroke for which the door hinge assembly 5 and the guide wheel assembly 6 advance; a crank lever 63 is fixed to the bottom of the second movable joint 62 in a rotating manner; a stopper 65 for obstructing the crank lever 63 is provided at a rising side of the cylindrical guide wheel 61; and a sliding rail 64 is fixedly mounted on the window frame corresponding to the cylindrical guide wheel 61.

Figure 19:
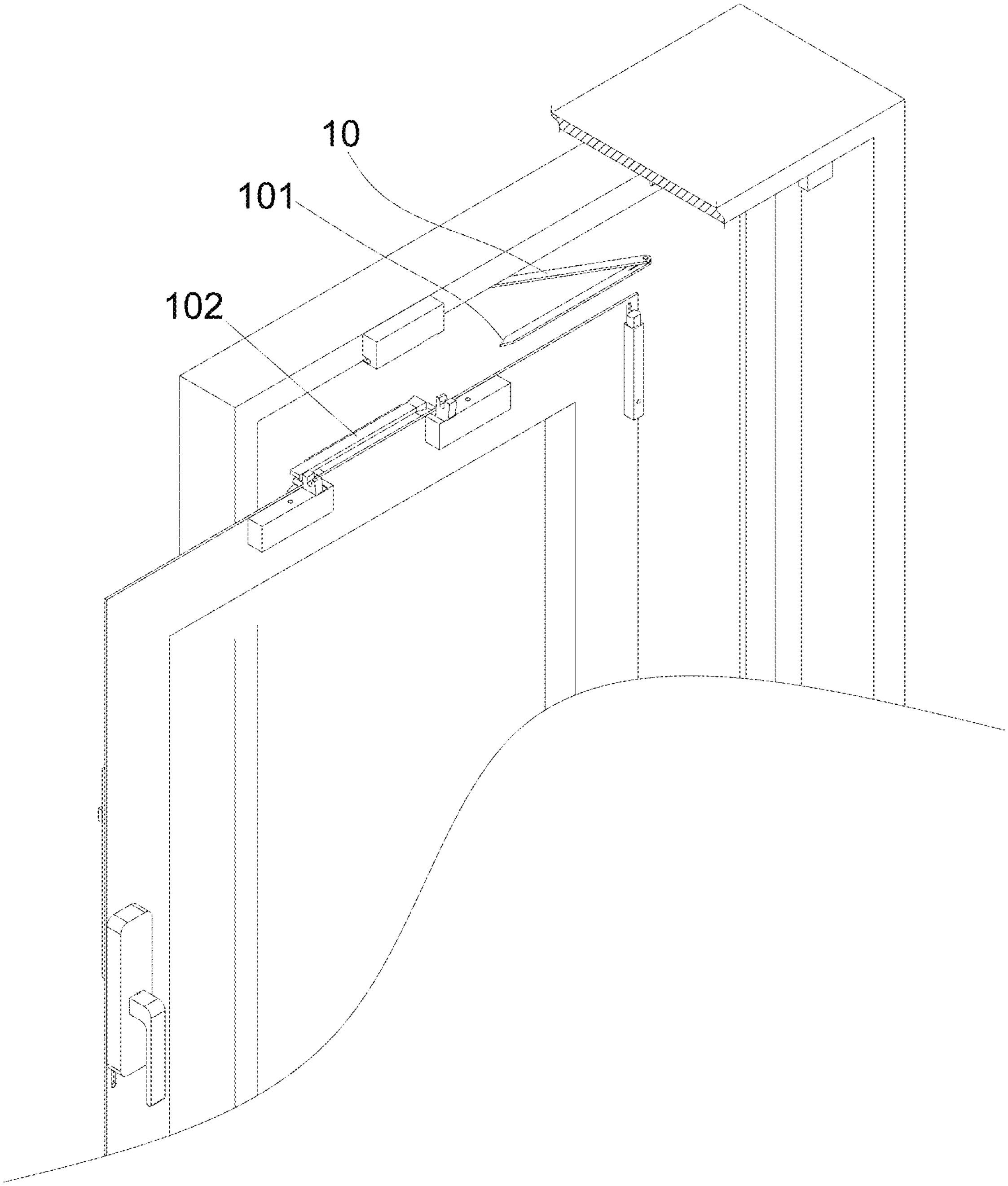
FIG. 19 is a schematic structural diagram of assembly between a wind brace, a wind brace sleeve, the window frame and the window sash according to the present invention.
Figure 20:
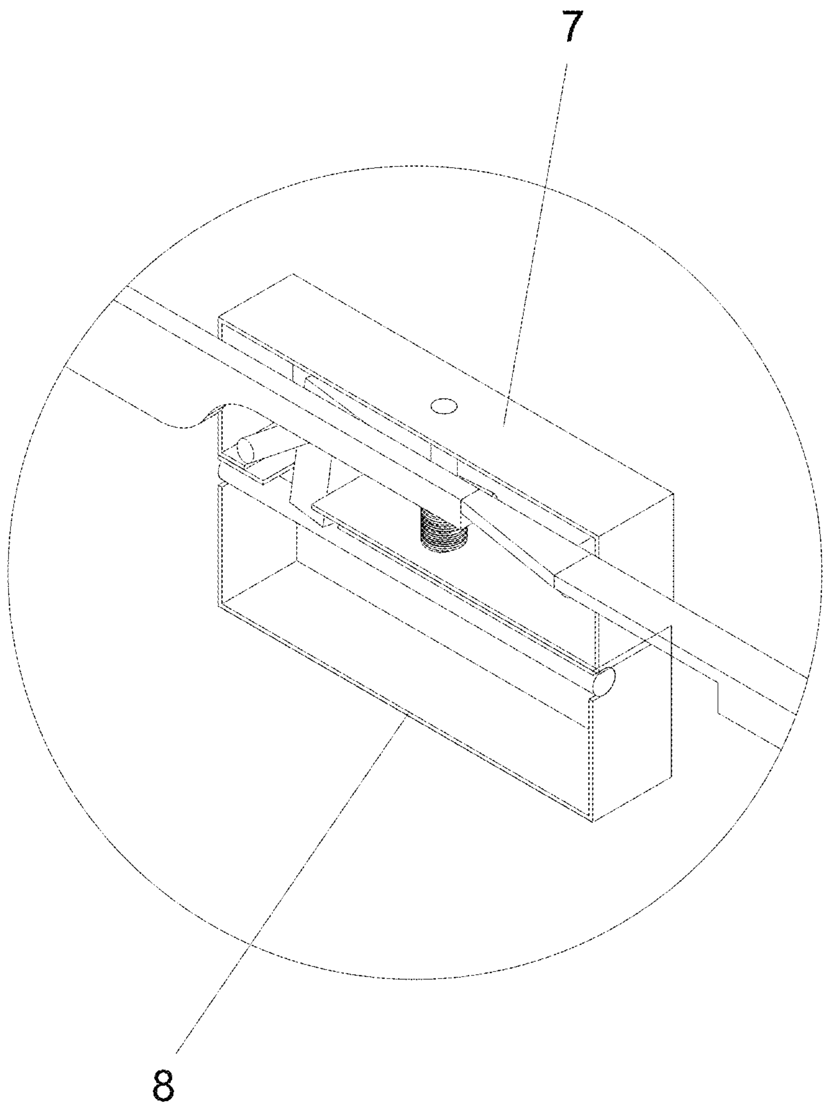
FIG. 20 is a schematic structural diagram of a lock assembly according to the present invention.

Referring to FIG. 19, the wind brace 10 is of a multi-section structure; one end of the wind brace 10 is fixed to the top of a window frame, and the other end of the wind brace 10 is fixedly provided with a front upright 101; a wind brace sleeve 102 that matches the front upright 101 is fixedly mounted at the top of the window sash and located above the second gear tooth combination 41: the wind brace sleeve 102 is arranged corresponding to the front upright 101; and a housing for supporting the wind brace sleeve 102 is fixedly arranged outside the second gear tooth combination 41, which prevents the wind brace sleeve 102 from interfering with movement of the second gear tooth combination 41.

Figure 5:
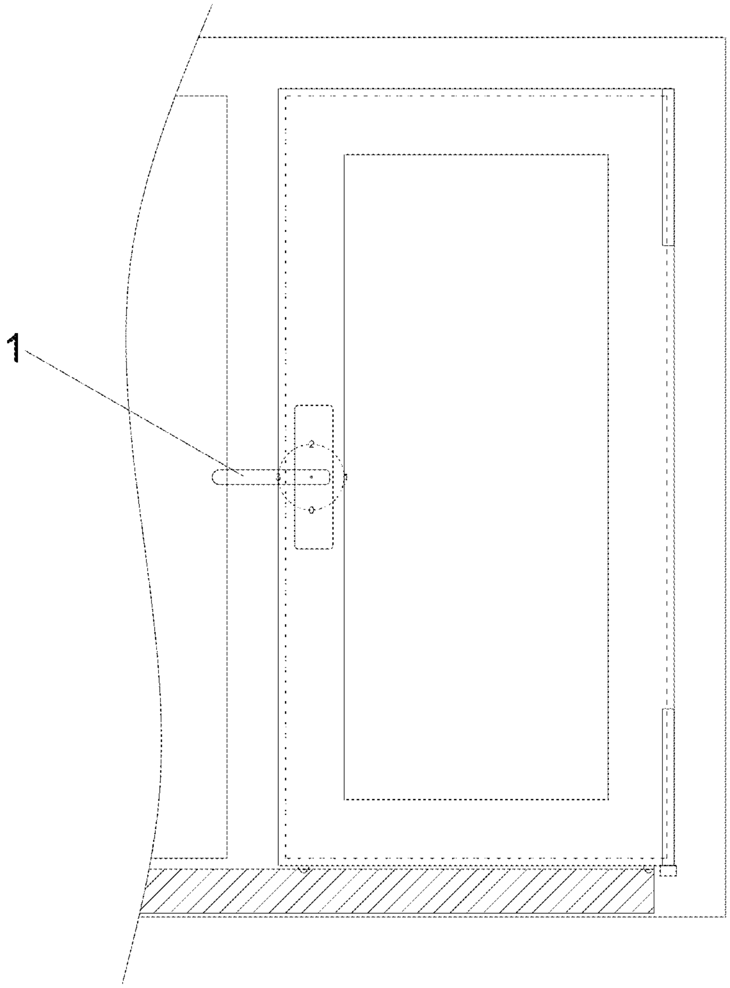
FIG. 5 is a schematic structural diagram of gear positions 0, 1, 2 and 3 in a circumferential direction of a handle according to the present invention.
Figure 6:
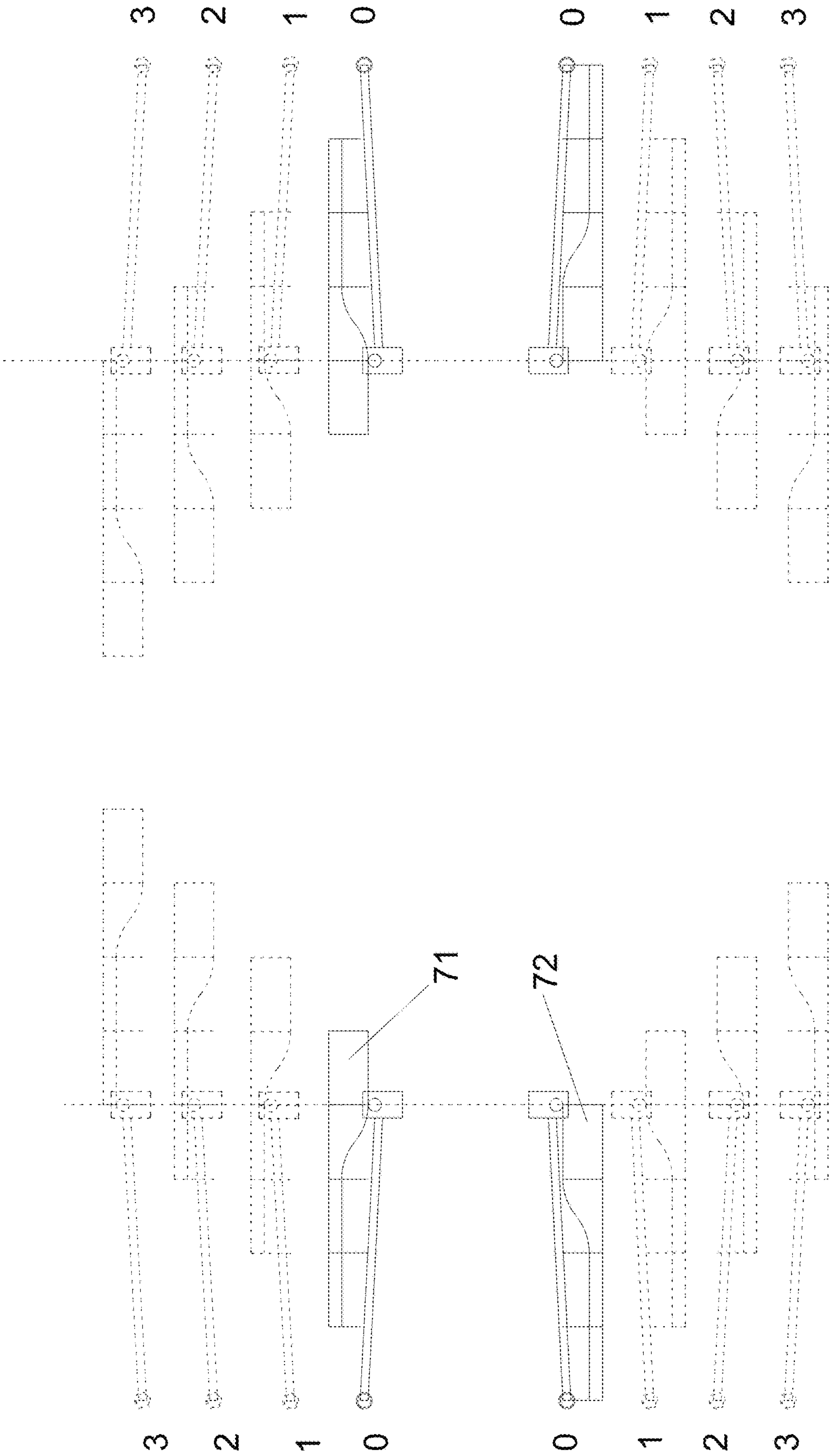
FIG. 6 is a schematic structural diagram of state presentation of spring bolt driving blocks a and b corresponding to the gear positions 0, 1, 2 and 3 according to the present invention.
Figure 7:
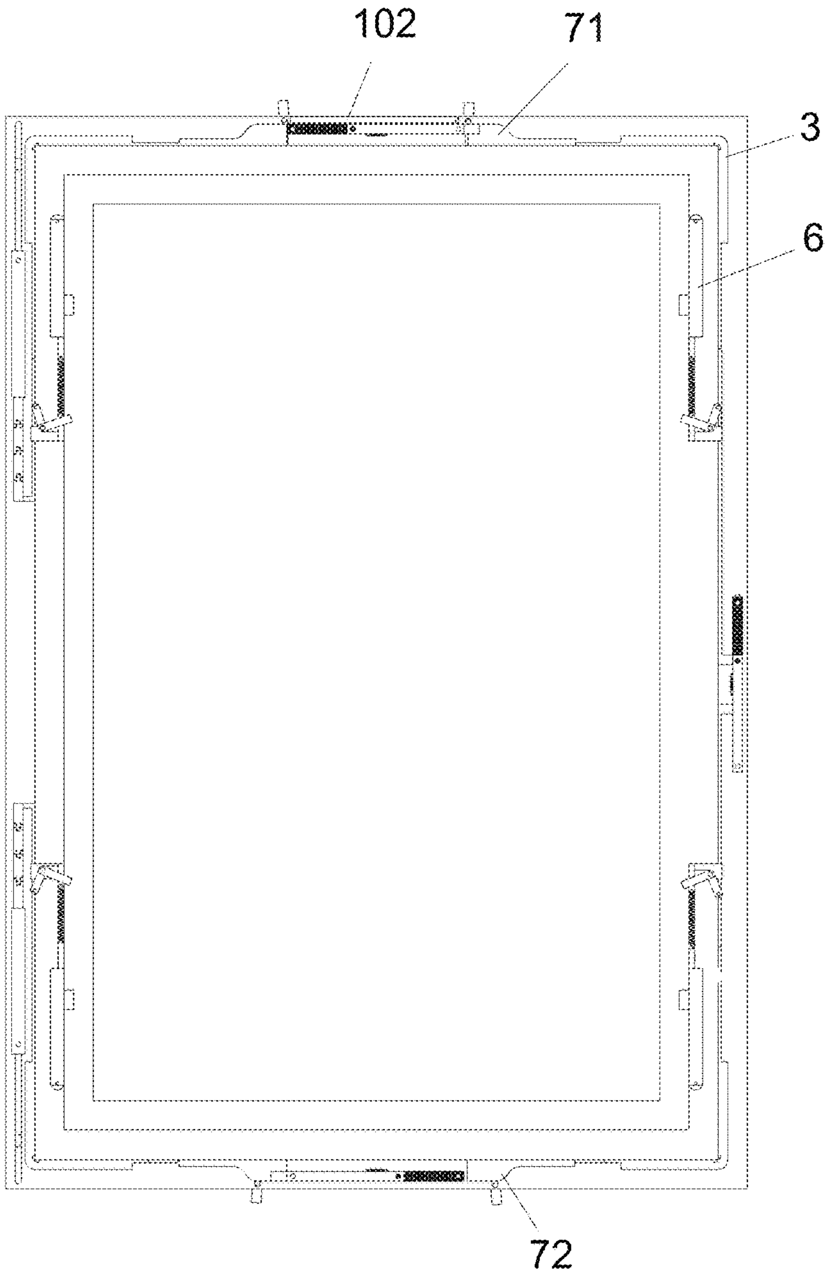
FIG. 7 is a schematic diagram of a rear view structure of the window sash at the gear position 0 according to the present invention.
Figure 8:
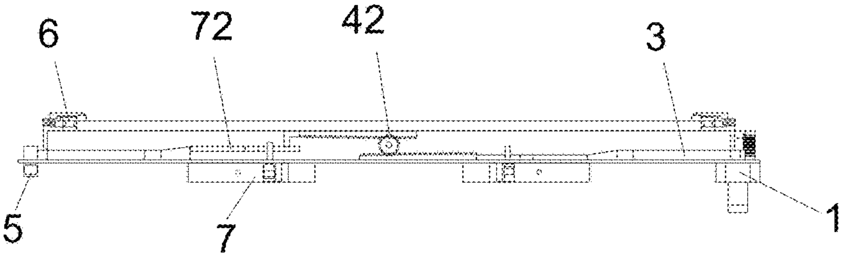
FIG. 8 is a schematic diagram of a bottom view structure of the window sash at the gear position 0 according to the present invention.
Figure 9:
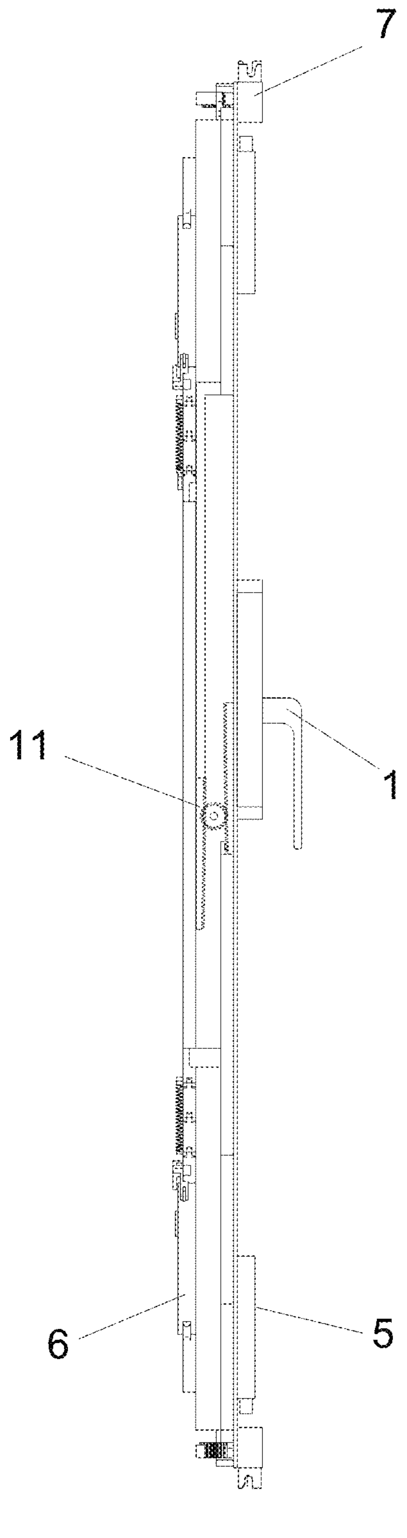
FIG. 9 is a schematic diagram of a left view structure of the window sash at the gear position 0 according to the present invention.
Figure 10:
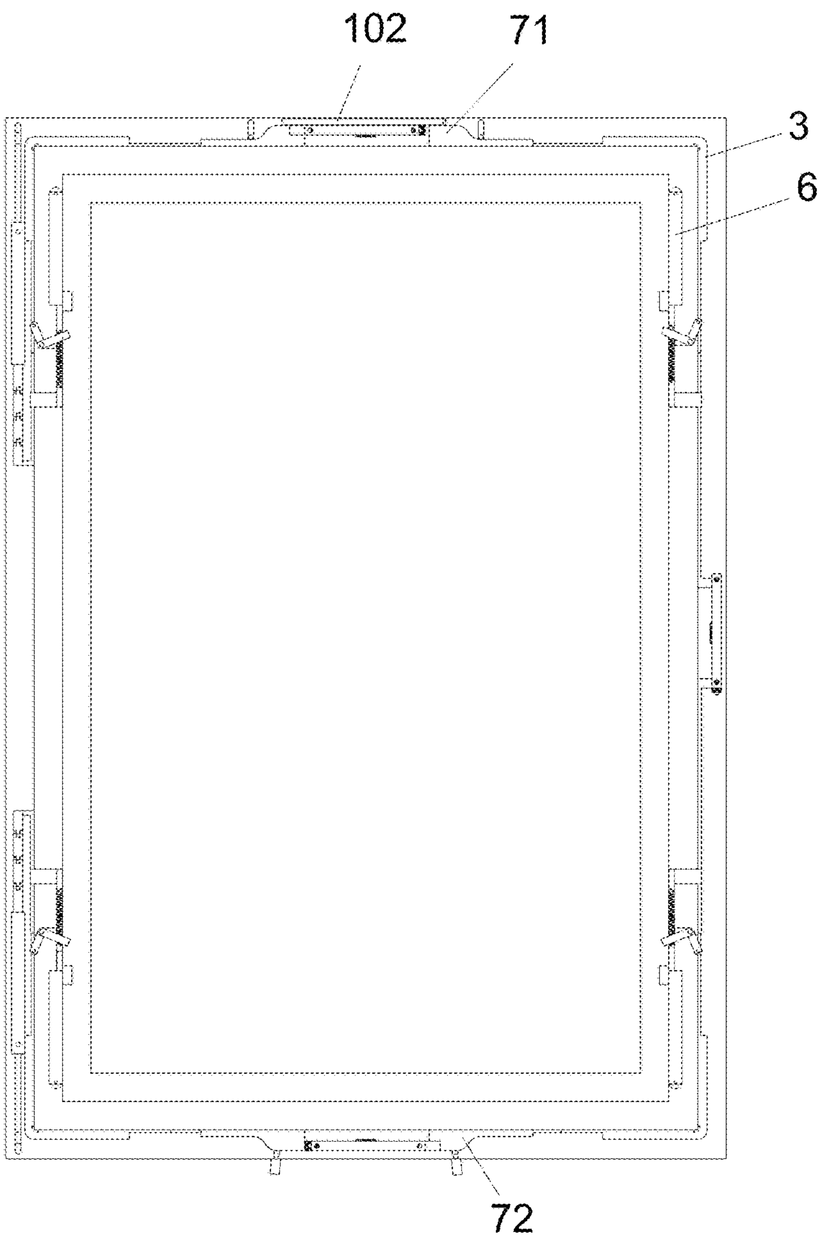
FIG. 10 is a schematic diagram of a rear view structure of the window sash at the gear position 1 according to the present invention.
Figure 11:
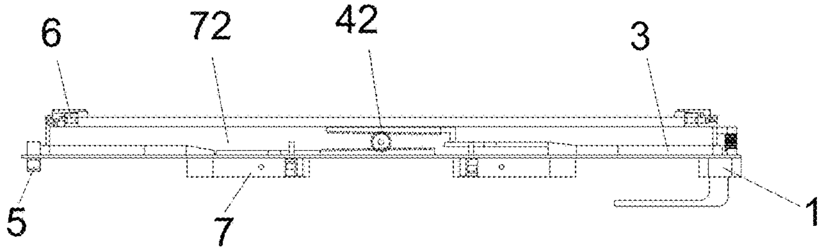
FIG. 11 is a schematic diagram of a bottom view structure of the window sash at the gear position 1 according to the present invention.
Figure 12:
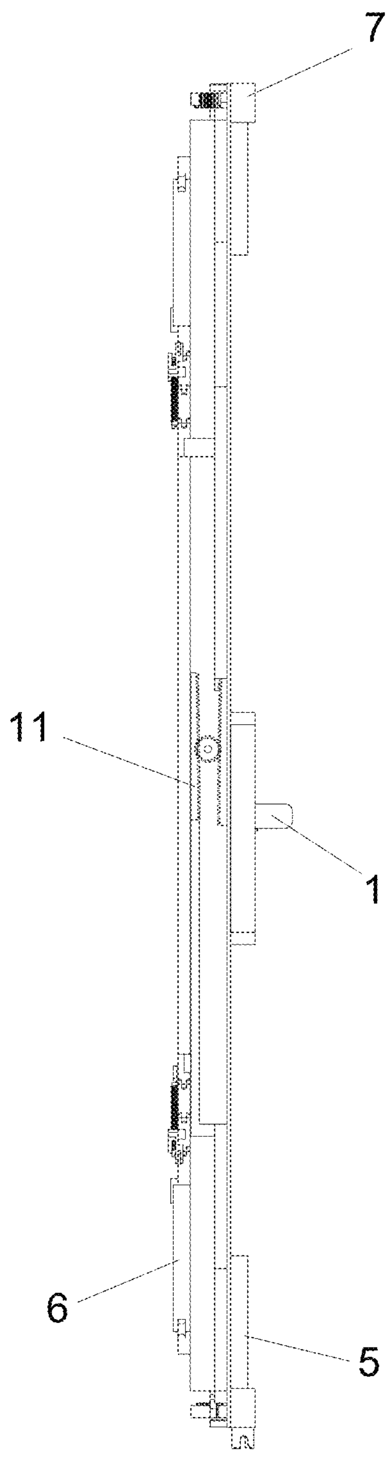
FIG. 12 is a schematic diagram of a left view structure of the window sash at the gear position 1 according to the present invention.
Figure 13:
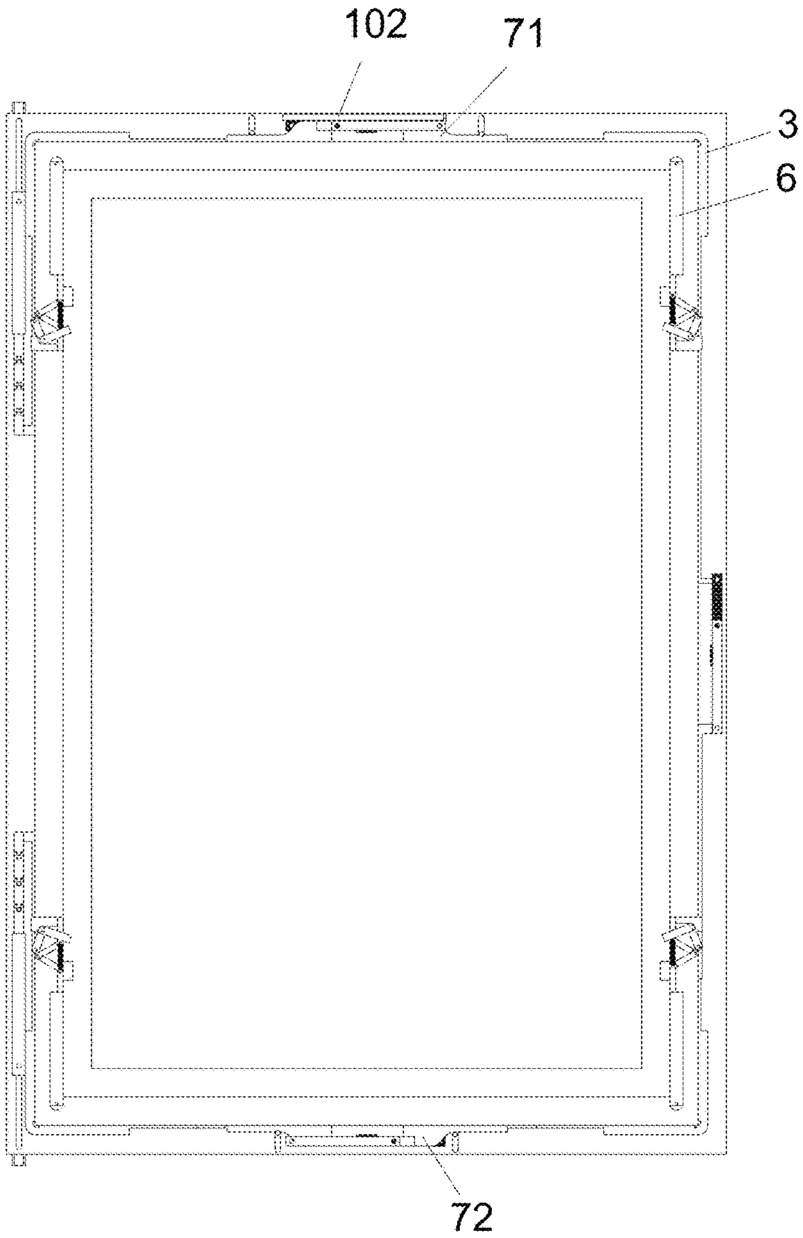
FIG. 13 is a schematic diagram of a rear view structure of the window sash at the gear position 2 according to the present invention.
Figure 14:
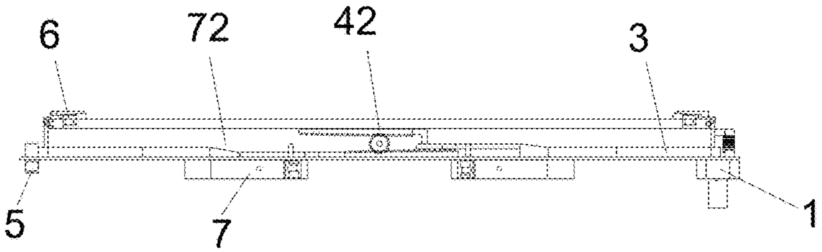
FIG. 14 is a schematic diagram of a bottom view structure of the window sash at the gear position 2 according to the present invention.
Figure 15:
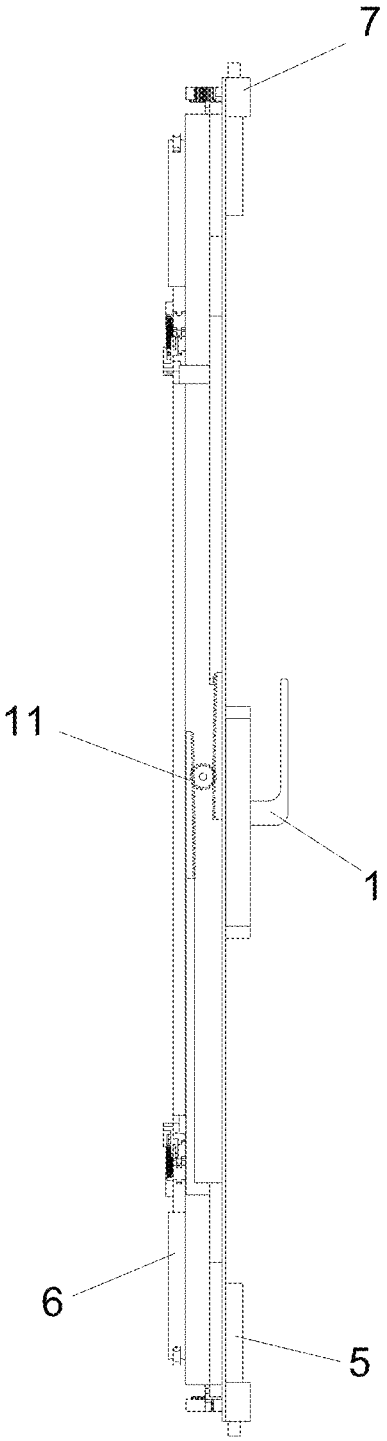
FIG. 15 is a schematic diagram of a left view structure of the window sash at the gear position 2 according to the present invention.
Figure 16:
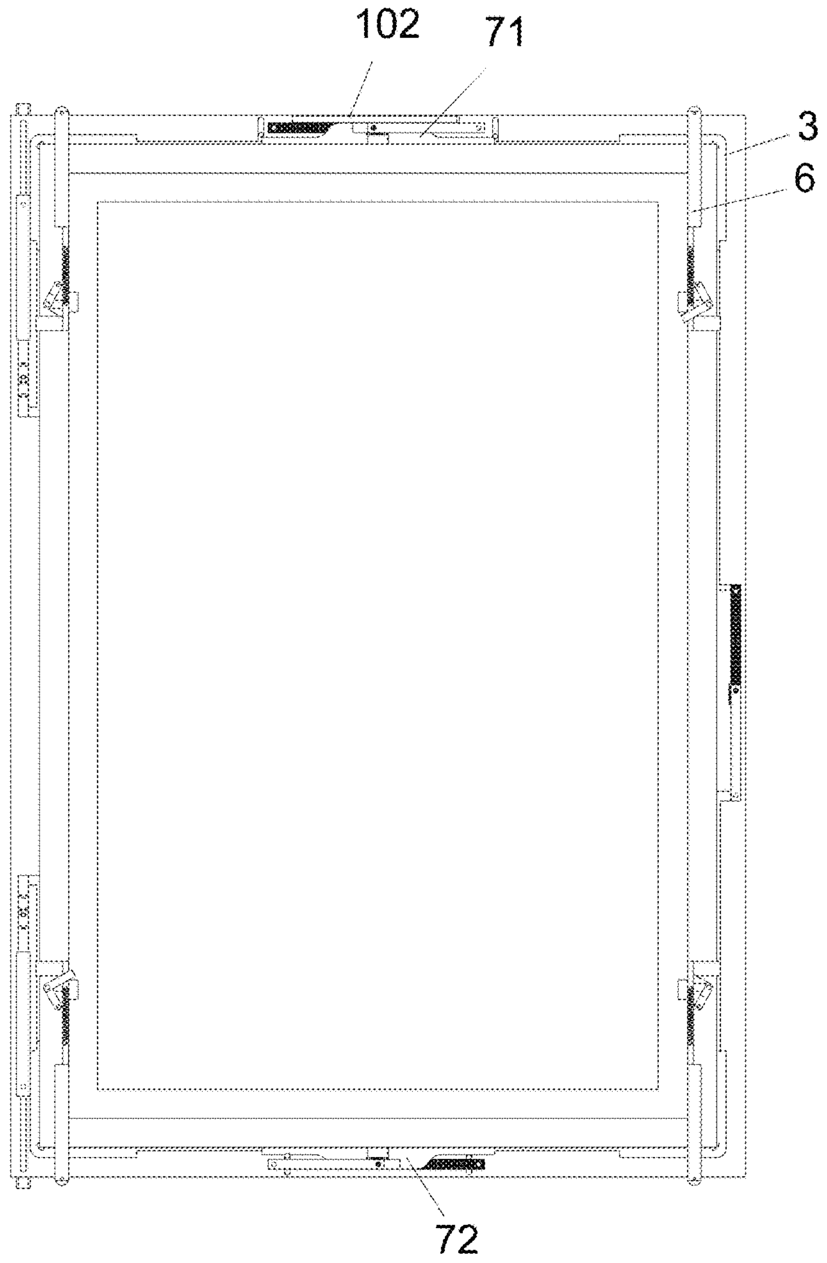
FIG. 16 is a schematic diagram of a rear view structure of the window sash at the gear position 3 according to the present invention.
Figure 17:
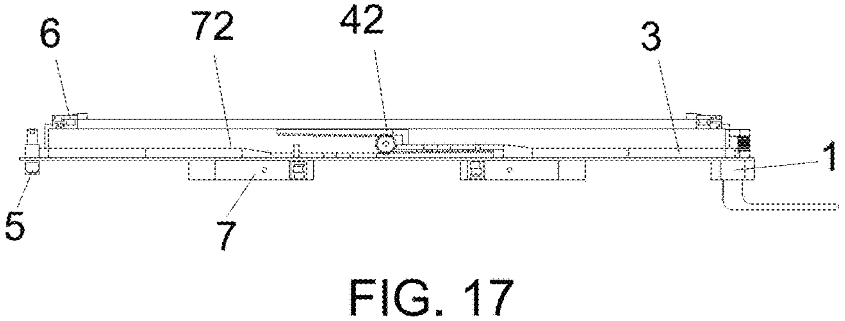
FIG. 17 is a schematic diagram of a bottom view structure of the window sash at the gear position 3 according to the present invention.
Figure 18:
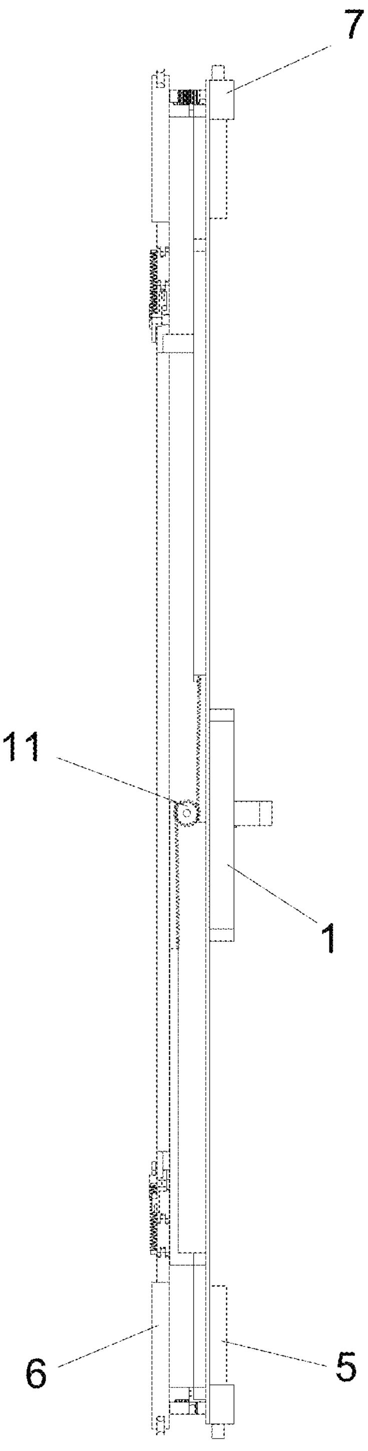
FIG. 18 is a schematic diagram of a left view structure of the window sash at the gear position 3 according to the present invention.

Referring to FIG. 5, which shows the transmission system allowing a window to be opened in three directions, the door and window opening transmission system is composed of door and window hardware. The system enables the related door hinge assembly, guide wheel assembly, lock assembly and other hardware to complete corresponding actions via the gear positions 0, 1, 2 and 3 scaled on the handle, so as to realize opening and closing of the window sash in three directions, i.e., inward tilting, inward translating and push-pull. Moreover, owing to the unique design of the wind brace, the opening degree of the window sash can be adjusted in a state of inward tilt opening, and the problem of metal fatigue of hardware and the problem of disengagement of the window sash are effectively solved.

Referring to FIGS. 5 to 22, specifically, before use, the scales of gear positions 0, 1, 2 and 3 are arranged on a shell piece of the handle 1 in a circumferential direction of the handle 1, and the four gear positions correspond to three advancing strokes of the door hinge assembly 5, the guide wheel assembly 6 and the lock assembly 7, namely a first stroke, a second stroke and a third stroke. The first stroke, the second stroke and the third stroke respectively correspond to open states of the window sash, i.e., inward tilt opening, in-swinging opening and inward translating opening.

When the window sash is set to a closed state, a shank of the handle 1 is located at the scale of gear position 0. At this time, spring bolts of the lock assemblies 7 at the upper end and at the lower end of the window sash are both located in the spring bolt catch 8. The spring bolt catch 8 is internally provided with a horizontal shaft, which allows the spring bolt to be in snap-fit or rotate.

First Stroke

When the shank of the handle 1 is rotated counterclockwise by 90 degrees, the gear position is shifted from gear position 0 to gear position 1. At this time, the whole transmission system correspondingly advances for one stroke, the first movable joint 52 and the second movable joint 62 move in a straight state under the restriction of a limiter on the window sash, and the first transmission lever 21 and the second transmission lever 22 move reversely for one stroke under the drive of the first gear tooth combination 11, and drive the door hinge assembly 5, the guide wheel assembly 6, the first spring bolt driving block 71 and the second spring bolt driving block 72 to advance for one stroke respectively under the linkage of the angle converter. Since the horizontal displacement of the first spring bolt driving block 71 is one stroke faster than the second spring bolt driving block 72, the spring bolt in the lock assembly 7 located at one side of the first spring bolt driving block 71 is retracted into the lock body first, and the spring bolt is disengaged from the spring bolt catch 8; and the spring bolt in the lock assembly 7 at one side of the second spring bolt driving block 72 does not move, and the spring bolt is not retracted into the lock body, but remains in the spring bolt catch 8 to play a locking role. At this time, the handle 1 is pulled inwards, and the upper end of the window sash is opened. Since the spring bolt at the lower part of the window sash fits the horizontal shaft of the spring bolt catch 8, the lower end of the window sash cannot be opened but can be rotated along the horizontal shaft. The inward tilt action is completed when the window sash is opened to a maximum angle set by the wind brace 10.

Second Stroke

First, the opened window sash is pushed back into the window frame, the shank of the handle 1 is continuously rotated counterclockwise by 90 degrees, and the gear position is shifted from position 1 to position 2. At this time, the whole transmission system correspondingly continues to advance for one stroke, and the second movable joint 62 is free from restriction by the limiter on the window sash. The first transmission lever 21 and the second transmission lever 22 continue to move reversely for one stroke under the drive of the first gear tooth combination 11, and drive each of the door hinge assembly 5, the guide wheel assembly 6, the first spring bolt driving block 71 and the second spring bolt driving block 72 to advance for one stroke under the linkage of the angle converter. Since the cylindrical guide wheel 61 on the guide wheel assembly 6 is obstructed by the window frame and cannot continue to advance, at this time, the second movable joint 62 has been disengaged from a limiter on the window frame and may be flexed. The second movable joint 62 is straightened and flexed for exactly one stroke. The distance traveled by the cylindrical guide wheel 61 in the guide wheel assembly 6 during the second stroke is accumulated on the flexed second movable joint 62. The door hinge 51 on the door hinge assembly 5 may not be obstructed by the window frame, and may continue to advance for one stroke, so that the front end of the door hinge 51 enters the door-hinge slot 50 and reaches the bottom of the door-hinge slot 50. The horizontal displacement of the first spring bolt driving block 71 does not work on the spring bolt in the corresponding lock assembly 7, so that the spring bolt is located in the lock body, and the spring bolt is disengaged from the spring bolt catch 8. The horizontal displacement of the second spring bolt driving block 72 works on the spring bolt in the corresponding lock assembly 7, so that the spring bolt is retracted into the lock body, and the spring bolt is disengaged from the spring bolt catch 8. At this time, the all spring bolts in four lock assemblies 7 at upper and lower parts of the window sash are retracted into the lock body, and all the upper and lower door hinges 51 enter the corresponding door-hinge slots 50. The window sash can be opened horizontally by pulling the shank toward the indoors, and rotating the window sash counterclockwise, and the opening angle may be greater than 90 degrees.

Third Stroke

The window sash opened horizontally is rotated to a 90-degree open position, and the door hinge is pulled. At this time, the door hinge 51 may enter the second door-hinge slot 502 from the first door-hinge slot 501 along the sliding rail between the first door-hinge slot 501 and the second door-hinge slot 502. The window sash is rotated clockwise by 90 degrees after the door hinge 51 enters the second door-hinge slot 502. At this time, the window sash is parallel with the window frame, the first movable joint 52 is in a straightened state, and the second movable joint 62 is in a flexed state. By operating the third stroke, the shank of the handle 1 is continuously rotated counterclockwise by 90 degrees, the gear position is shifted from position 2 to position 3, and the whole transmission system correspondingly continues to advance for one stroke. The first movable joint 52 and the second movable joint 62 are free from restriction by the limiter on the window sash. The first transmission lever 21 and the second transmission lever 22 continue to move reversely for one stroke under the drive of the first gear tooth combination 11, and drive each of the door hinge assembly 5, the guide wheel assembly 6, the first spring bolt driving block 71 and the second spring bolt driving block 72 to advance for one stroke under the linkage of the angle converter. At this time, a power arm of the crank lever 63 is obstructed by the stopper 65, so that the crank lever 63 rotates in the obstructing direction along a fulcrum. At this time, a resisting arm of the crank lever 63 may work on the flexed second movable joint 62, so that the flexed second movable joint 62 may be straightened again. In this process, the cylindrical guide wheel 61 completes two strokes, so that the cylindrical guide wheel 61 extends out of the upper edge and the lower edge of the window sash and fits the sliding rail 64 mounted on the window frame. Since the door hinge 51 has entered the very bottom of the door-hinge slot 50 and cannot advance, in the third stroke, the first movable joint 52 in the door hinge assembly 5 is flexed to offset the movement distance of the third stroke. The first spring bolt driving block 71 and the second spring bolt driving block 72 do not work on the spring bolt in the third stroke. In this process, the spring bolt is in the lock body. At this time, the window sash may travel between the upper and lower sliding rails 64 by transversely pulling the shank, so as to realize translating of the window sash. The window sash is opened to the fullest extent to the limiter at the distal end of the window sash, so as to complete the push-pull opening action.

When the window sash is closed, opened by means of inward tilting and opened horizontally, the front upright 101 of the wind brace 10 is in the wind brace sleeve 102. The role of connection and the role of determining the opening degree are played when the window sash is opened by means of inward tilting. When the window sash is opened horizontally, the wind brace 10 causes the front upright 101 to be disengaged from the wind brace sleeve 102 as the window sash travels. The front upright 101 of the wind brace 10 may be inserted into the wind brace sleeve 102 again when the window sash returns to the original position of the window frame again.

The procedure for closing the window sash is a reverse operation of opening.

The foregoing descriptions are merely preferred embodiments of the present invention, and are not intended to limit the present invention. Although the present invention is described in detail with reference to the foregoing embodiments, those skilled in the art can still modify the technical solutions described in the foregoing embodiments or make equivalent substitutions for some of the technical features therein. Any modifications, equivalent substitutions, improvements and the like made within the spirit and principles of the present invention should be included within the scope of protection of the present invention.

What is claimed is:

1. A transmission system allowing a window to be opened in three directions, comprising door hinge assemblies, a guide wheel assembly, lock assemblies, a wind brace, a handle, a first transmission lever, a second transmission lever, an angle converter, a first gear tooth combination, a second gear tooth combination and a third gear tooth combination, wherein the angle converter is connected at a position of the first transmission lever and a position of the second transmission lever, wherein the position of the first transmission lever and the position of the second transmission lever are located at corners of a window sash; and the first gear tooth combination is arranged in the handle for driving the first transmission lever and the second transmission lever to move synchronously and reversely;

the first transmission lever is connected to the second gear tooth combination at a position at a top of the window sash, a first lock assembly and a second lock assembly of the lock assemblies are synchronous and are symmetrically provided at two sides of the second gear tooth combination, and a first spring bolt driving block in the second lock assembly is connected between the second gear tooth combination and the first transmission lever;

the second transmission lever is connected to the third gear tooth combination at a position at a bottom of the window sash, a third lock assembly and a fourth lock assembly of the lock assemblies are synchronous and are symmetrically provided at two sides of the third gear tooth combination, and a second spring bolt driving block in the fourth lock assembly is connected between the third gear tooth combination and the second transmission lever;

the door hinge assemblies are symmetrically arranged at two ends of a side of the window sash, wherein the side of the window sash is away from the handle, the door hinge assemblies at an upper end and a lower end of the window sash are respectively connected to the first transmission lever and the second transmission lever that move synchronously, and a door hinge on each of the door hinge assemblies is provided with a first movable joint for flexing;

the guide wheel assembly is arranged at each corner of the window sash, the guide wheel assembly located at an upper part of the window sash is connected to the first transmission lever, the guide wheel assembly located at a lower part of the window sash is connected to the second transmission lever, a second movable joint for flexing is arranged in the guide wheel assembly and located at a bottom of a cylindrical guide wheel, a crank lever is fixed to a bottom of the second movable joint in a rotating manner, and a rising side of the cylindrical guide wheel is provided with a stopper for obstructing the crank lever;

the wind brace is of a multi-section structure, a first end of the wind brace is fixed to a top of a window frame, a second end of the wind brace is fixedly provided with a front upright, a wind brace sleeve matching the front upright is provided at the top of the window sash, and the wind brace sleeve is arranged corresponding to the front upright; and the transmission system further comprises a spring bolt catch, a door-hinge slot and a sliding rail, wherein the spring bolt catch, the door-hinge slot and the sliding rail are respectively fixed to the window frame corresponding to the lock assemblies, the door hinge assemblies and the guide wheel assembly.

2. The transmission system allowing the window to be opened in three directions according to claim 1, wherein scales of four gear positions 0, 1, 2 and 3 are arranged on a shell piece of the handle in a circumferential direction of the handle, and the four gear positions correspond to three advancing strokes of the door hinge assemblies, the guide wheel assembly and the lock assemblies, wherein the three advancing strokes are a first stroke, a second stroke and a third stroke, and the first stroke, the second stroke and the third stroke respectively correspond to open states of the window sash, wherein the open states of the window sash are horizontal opening, inward translating opening and inward tilt opening.

3. The transmission system allowing the window to be opened in three directions according to claim 2, wherein the first movable joint and the second movable joint are flexed to accumulate a stroke the same as one stroke for which the door hinge assembly and the guide wheel assembly advance.

4. The transmission system allowing the window to be opened in three directions according to claim 1, wherein the first gear tooth combination comprises a first rack, a second rack, a third rack, a fourth rack, a first gear and a second gear; the first gear is fixedly arranged on a rotating shaft of the handle; the first rack and the second rack are distributed at two sides of the first gear in parallel and engage the first gear; the third rack and the fourth rack are distributed at two sides of the second gear in parallel and engage the second gear; the third rack is vertically fixed to a lateral part of the second rack; the third rack and the fourth rack are configured to move synchronously and reversely under a drive of the handle; the first transmission lever is fixed to the fourth rack; and the second transmission lever is fixed to the third rack.

5. The transmission system allowing the window to be opened in three directions according to claim 1, wherein each of the second gear tooth combination and the third gear tooth combination comprises a fifth rack, a sixth rack and a third gear; the fifth rack and the sixth rack are arranged at two sides of the third gear in parallel and engage the third gear; the first spring bolt driving block in the second lock assembly and the second spring bolt driving block in the fourth lock assembly are connected to the corresponding fifth rack and sixth rack according to a synchronous and reverse moving relationship; and a slope on the first spring bolt driving block for driving a spring bolt to rise/fall is horizontally located one stroke faster than the second spring bolt driving block.

6. The transmission system allowing the window to be opened in three directions according to claim 1, wherein the door-hinge slot comprises a first door-hinge slot and a second door-hinge slot, wherein the first door-hinge slot and the second door-hinge slot are of blind hole structures; a chute is arranged between the first door-hinge slot and the second door-hinge slot; a notch is provided at a side of the second door-hinge slot, wherein the side of the second door-hinge slot faces toward inside of the window frame; and the notch is used for shift-out of an end portion of the door hinge of each of the door hinge assemblies.

* * * * *